United States Patent
Narushima

(10) Patent No.: US 10,324,336 B2
(45) Date of Patent: Jun. 18, 2019

(54) BACKLIGHT UNIT AND HEAD-UP DISPLAY DEVICE

(71) Applicant: Yazaki Corporation, Tokyo (JP)

(72) Inventor: Noriaki Narushima, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 16/120,710

(22) Filed: Sep. 4, 2018

(65) Prior Publication Data

US 2019/0072800 A1 Mar. 7, 2019

(30) Foreign Application Priority Data

Sep. 6, 2017 (JP) .................................. 2017-170944

(51) Int. Cl.
*G02F 1/1335* (2006.01)
*G02B 27/01* (2006.01)

(52) U.S. Cl.
CPC ...... *G02F 1/13362* (2013.01); *G02B 27/0101* (2013.01); *G02B 27/0149* (2013.01); *G02B 2027/015* (2013.01); *G02B 2027/0118* (2013.01); *G02F 2201/34* (2013.01)

(58) Field of Classification Search
CPC ............. G02F 1/13362; G02F 2201/34; G02B 27/0101; G02B 2027/0118; G02B 27/0149

See application file for complete search history.

(56) References Cited

U.S. PATENT DOCUMENTS

| | | | |
|---|---|---|---|
| 7,002,641 B2* | 2/2006 | Okuyama | G02F 1/133634 348/E9.027 |
| 2003/0063389 A1* | 4/2003 | Koyama | G02B 27/1026 359/618 |
| 2003/0067586 A1* | 4/2003 | Chigira | G02B 27/283 353/20 |
| 2003/0081317 A1* | 5/2003 | Katsumata | G02B 27/283 359/566 |
| 2007/0085971 A1* | 4/2007 | Okuyama | G02B 27/283 353/20 |
| 2010/0091247 A1* | 4/2010 | Yamamoto | G03B 21/28 353/20 |
| 2010/0238410 A1* | 9/2010 | Maeda | G02B 27/1046 353/20 |

(Continued)

FOREIGN PATENT DOCUMENTS

JP 2016-065908 A 4/2016

*Primary Examiner* — Donald L Raleigh
(74) *Attorney, Agent, or Firm* — Sughrue Mion, PLLC

(57) ABSTRACT

In the backlight unit, the polarizing plate causes light oscillating in a direction orthogonal to the reference oscillation direction transmit to the quarter wavelength plate among beams of the light incident from the light collecting member, with the oscillation direction of the light transmitting through the liquid crystal panel as the reference oscillation direction, and reflects light oscillating in the reference oscillation direction from a side of the micromirror array toward the liquid crystal panel. The quarter wavelength plate converts the light incident from the polarizing plate side and transmitting to the side of the micromirror array into the first polarized light, and converts the first polarized light reflected by the mirror array and transmitting toward the polarizing plate into the second polarized light oscillating in a direction identical to the reference oscillating direction.

4 Claims, 4 Drawing Sheets

(56) References Cited

U.S. PATENT DOCUMENTS

| | | | |
|---|---|---|---|
| 2013/0120713 A1* | 5/2013 | Homma | H04N 13/363 353/20 |
| 2013/0182302 A1* | 7/2013 | Shikii | B60K 35/00 359/13 |
| 2014/0063466 A1* | 3/2014 | Homma | G02B 27/26 353/20 |
| 2015/0130687 A1* | 5/2015 | Kitamura | G02B 27/01 345/7 |
| 2015/0222864 A1* | 8/2015 | Inoko | F21V 9/14 353/31 |
| 2015/0316782 A1* | 11/2015 | Maeda | G03B 21/006 353/20 |
| 2016/0370176 A1* | 12/2016 | Furuta | G01B 11/0608 |
| 2018/0157036 A1* | 6/2018 | Choi | G02B 27/0101 |
| 2018/0348515 A1* | 12/2018 | Kuzuhara | B60K 35/00 |
| 2018/0348562 A1* | 12/2018 | Yoshida | G02F 1/13362 |

* cited by examiner

BACKLIGHT UNIT AND HEAD-UP DISPLAY DEVICE

CROSS-REFERENCE TO RELATED APPLICATION(S)

The present application claims priority to and incorporates by reference the entire contents of Japanese Patent Application No. 2017-170944 filed in Japan on Sep. 6, 2017.

BACKGROUND OF THE INVENTION

1. Field of the Invention

The present invention relates to a backlight unit and a head-up display device.

2. Description of the Related Art

Conventionally, there is a backlight unit used for a head-up display device or the like. For example, in Japanese Patent Application Laid-open No. 2016-65908, after converting light of a light source into parallel light by collimated light generating means, light beams of a plurality of light source images are generated from the parallel light by a lens array and are condensed on the liquid crystal panel via a condensing lens or the like, in order to reduce luminance unevenness of a liquid crystal panel. Furthermore, in Japanese Patent Application Laid-open No. 2016-65908, a reflecting portion is disposed on an optical path between the light source and the liquid crystal panel, and a length in a depth direction of the backlight unit is shortened by folding the optical path.

In recent years, with the increase in a screen size and a higher definition of the head-up display device, the liquid crystal panel has been expanding, and the necessity of expanding the illumination range of the backlight unit has arisen. For example, when expanding an illumination range by using a concave mirror as a reflecting mirror that folds the optical path, in order to avoid interference between optical components such as condensing lens and the optical path, it is necessary to provide an angle to the optical axis before and after the reflection of light in the concave mirror. However, this is a cause of luminance unevenness due to the difference in reflection position of light in the concave mirror.

SUMMARY OF THE INVENTION

A purpose of the present invention is to provide a backlight unit and a head-up display device capable of suppressing occurrence of luminance unevenness.

According to an aspect of the present invention, a backlight unit includes: a light source; a light collecting member condensing light emitted from the light source; an optical member having a concave reflecting surface facing the light collecting member and reflecting light incident from the light collecting member toward the light collecting member by the reflecting surface; a polarizing plate disposed on an optical path between the light collecting member and the optical member, transmitting a part of light incident from the light collecting member, and reflecting light incident from a side of the optical member toward a light transmitting type liquid crystal display element; a quarter wavelength plate disposed on the optical path between the light collecting member and the optical member and on the side of the optical member with respect to the polarizing plate; and a diffusing plate disposed on an optical path between the polarizing plate and the liquid crystal display element. The polarizing plate causes light oscillating in a direction orthogonal to a reference oscillation direction to transmit to the quarter wavelength plate among beams of the light incident from the light collecting member, with an oscillation direction of the light transmitting through the liquid crystal display element as the reference oscillation direction, and reflecting light oscillating in the reference oscillation direction from the side of the optical member toward the liquid crystal display element, and the quarter wavelength plate converts light incident from a side of the polarizing plate and transmitting to the side of the optical member into first polarized light, and converts the first polarized light reflected by the optical member and transmitting to the side of the polarizing plate into second polarized light oscillating in a direction identical to the reference oscillating direction.

According to another aspect of the present invention, in the backlight unit, the optical member may have the reflecting surface including a plurality of micromirrors, and each of the micromirrors may be a convex or concave curved surface.

According to still another aspect of the present invention, in the backlight unit, the optical member may include a plurality of microlens formed along the reflecting surface, and each of the microlenses may have a lens surface having a convex or concave curved surface, and a micro reflecting surface corresponding to the lens surface.

According to still another aspect of the present invention, a head-up display device include: a light transmitting type liquid crystal display element; and a backlight unit. The backlight unit includes a light source; a light collecting member that condenses light emitted from the light source; an optical member having a concave reflecting surface facing the light collecting member and reflecting light incident from the light collecting member toward the light collecting member by the reflecting surface; a polarizing plate disposed on an optical path between the light collecting member and the optical member, transmitting a part of light incident from the light collecting member, and reflecting light incident from a side of the optical member toward the light transmitting type liquid crystal display element; a quarter wavelength plate disposed on the optical path between the light collecting member and the optical member and on the side of the optical member with respect to the polarizing plate; and a diffusing plate disposed on an optical path between the polarizing plate and the liquid crystal display element. The polarizing plate causes light oscillating in a direction orthogonal to a reference oscillation direction to transmit to the quarter wavelength plate among beams of the light incident from the light collecting member, with an oscillation direction of the light transmitting through the liquid crystal display element as the reference oscillation direction, and reflects light oscillating in the reference oscillation direction from the side of the optical member toward the liquid crystal display element, and the quarter wavelength plate converts light incident from a side of the polarizing plate and transmitting to the side of the optical member into a first polarized light, and converts light incident from the side of the optical member and transmitting to the side of the polarizing plate into a second polarized light oscillating in a direction identical to the reference oscillating direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a backlight unit according to the present invention will be described in detail with reference to the drawings. It should be noted that the present invention is not limited by this embodiment. In addition, constituent elements in the following embodiments include those which can be easily assumed by those skilled in the art or substantially the same. In addition, various omissions, substitutions, and changes can be made to the constituent elements in the embodiments below without departing from the gist of the invention.

Embodiment

Figure 1:
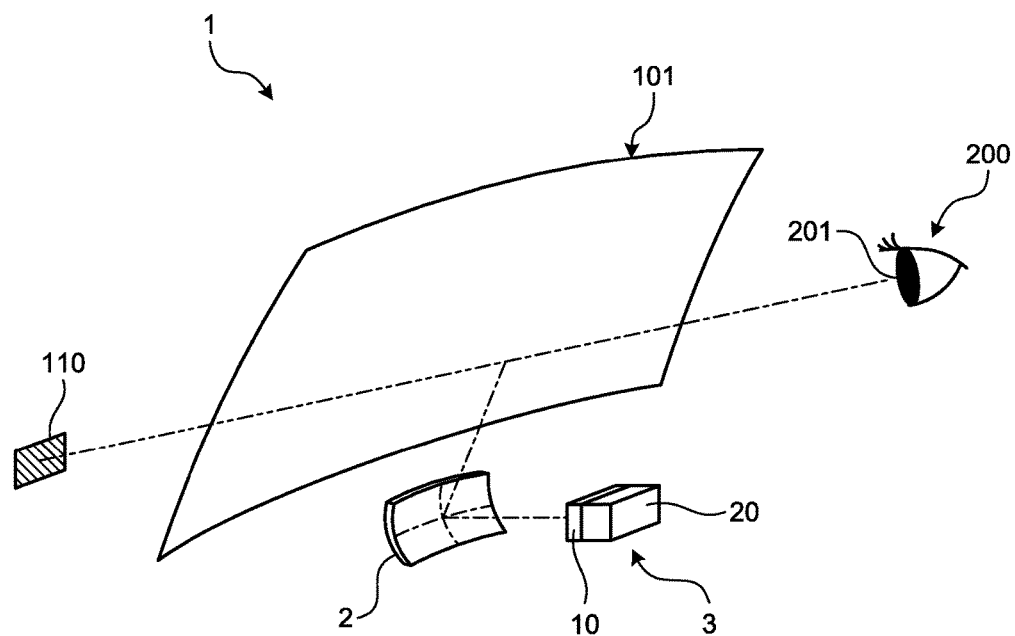
FIG. 1 is a schematic configuration diagram of a head-up display device according to an embodiment.
Figure 2:
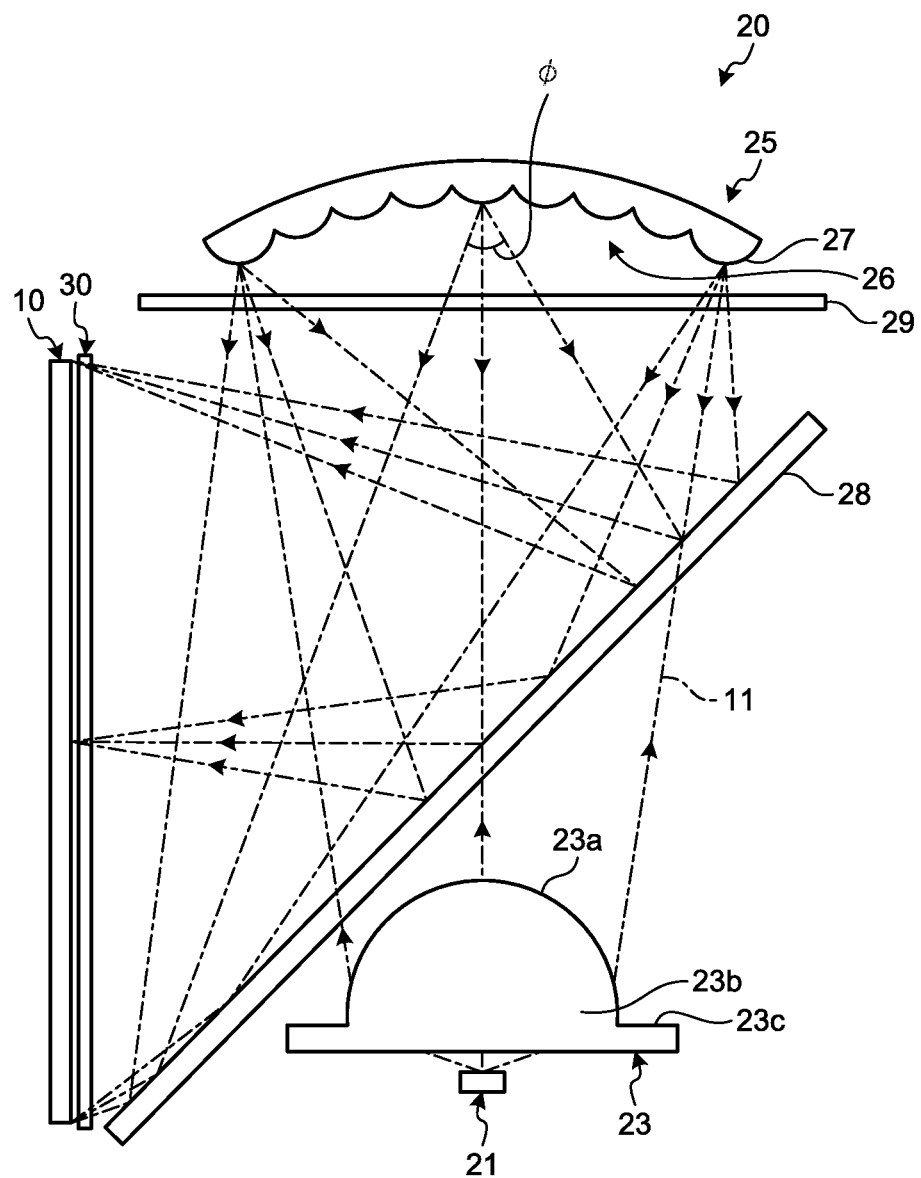
FIG. 2 is a schematic configuration diagram of a backlight unit according to the embodiment.
Figure 3:
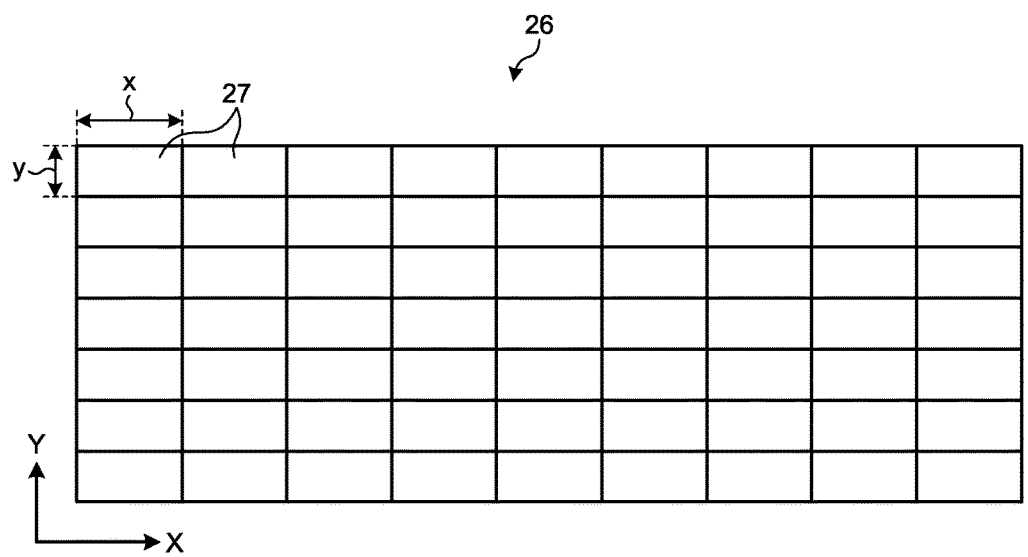
FIG. 3 is a front view of a micromirror array according to the embodiment.
Figure 4:
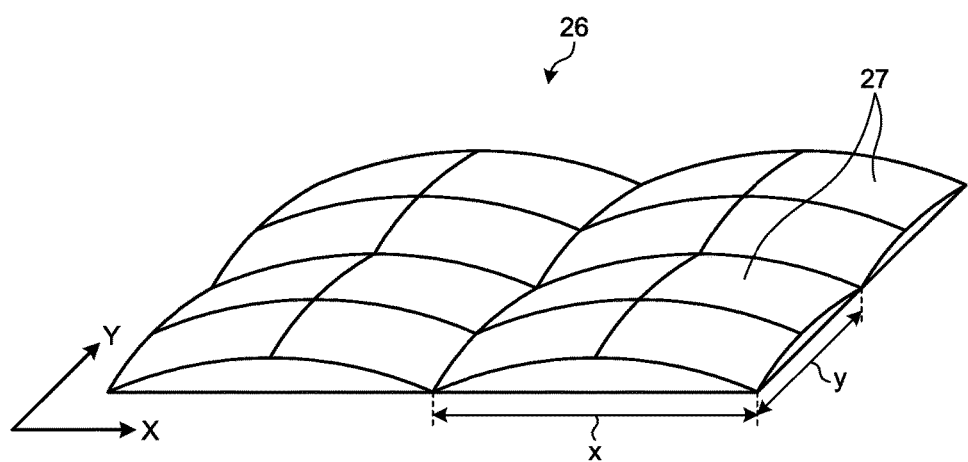
FIG. 4 is a perspective view of a micromirror according to the embodiment.
Figure 5:
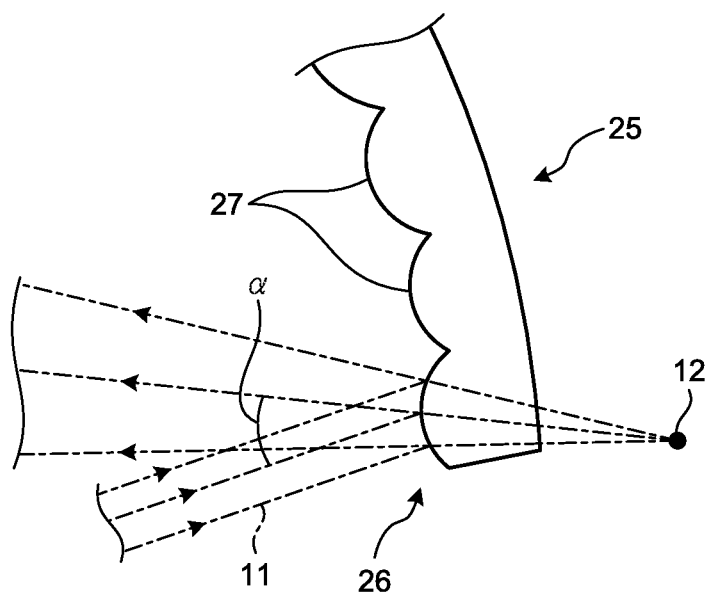
FIG. 5 is a partially enlarged view of the micromirror array according to the embodiment.

FIG. 1 is a schematic configuration diagram of a head-up display device according to an embodiment. FIG. 2 is a schematic configuration diagram of a backlight unit according to the embodiment. FIG. 3 is a front view of a micromirror array according to the embodiment. FIG. 4 is a perspective view of a micromirror according to the embodiment. FIG. 5 is a partially enlarged view of the micromirror array according to the embodiment. FIG. 2 illustrates a positional relationship of each element when the backlight unit is seen from the side. FIG. 3 is a front view of the micromirror array viewed from a reflecting surface.

As illustrated in FIG. 1, a head-up display device 1 according to the present embodiment is disposed inside a dashboard (not illustrated) of a vehicle (not illustrated) such as an automobile and projects a display image on a windshield 101. The head-up display device 1 projects a display image on the windshield 101 and displays a virtual image 110 in front of an eye point 201 of a driver 200. The eye point 201 is a predetermined position as a viewpoint position of the driver 200 seated in a driver's seat (not illustrated). The driver 200 recognizes the image reflected by the windshield 101 as the virtual image 110. For the driver 200, the virtual image 110 is recognized in front of the windshield 101. The head-up display device 1 includes an enlarging mirror 2 and a display unit 3. The enlarging mirror 2 reflects a display light emitted from the display unit 3 toward the windshield 101. The enlarging mirror 2 is made of, for example, an aspherical mirror. The display unit 3 emits display light corresponding to the display image. The display unit 3 includes a liquid crystal panel 10 and a backlight unit 20.

The liquid crystal panel 10 is a liquid crystal display element. The liquid crystal panel 10 is, for example, a light transmissive or semi-transmissive thin film transistor (TFT) liquid crystal display or the like. When the liquid crystal panel 10 is illuminated from a back side, a display surface on a front side emits light.

The backlight unit 20 illuminates the liquid crystal panel 10 from the back side. The backlight unit 20 is driven by DC power obtained from a power supply (not illustrated) in the vehicle. As illustrated in FIG. 2, the backlight unit 20 includes a light source 21, a light collecting member 23, a micromirror array 25, a polarizing plate 28, a quarter wavelength plate 29, and a diffusing plate 30.

The light source 21 includes one light emitting diode (LED: Light Emitting Diode). The light source 21 is driven by DC power obtained from the power supply in the vehicle. The light source 21 is turned on/off according to an ON/OFF signal from a control unit. The light source 21 is fixed to, for example, a substrate (not illustrated) or the like. A heat sink (not illustrated) may be fixed on the back side of the substrate. The heat sink releases the heat accumulated on the substrate to the outside of the backlight unit 20.

The light collecting member 23 condenses the light emitted from the light source 21. The light collecting member 23 is a condensing lens made of glass or a transparent resin, for example. The light collecting member 23 includes a convex curved lens surface 23a, a lens main body portion 23b having a lens surface 23a, and a flange portion 23c provided along an outer periphery of the lens main body portion 23b.

The micromirror array 25 is an optical member. The micromirror array 25 is made of, for example, a resin material or the like. The micromirror array 25 has a concave reflecting surface 26 facing the light collecting member 23 and reflects light 11 incident from the light collecting member 23 toward the light collecting member 23 by the reflecting surface 26. The micromirror array 25 is disposed at a position facing the light collecting member 23. In the micromirror array 25, the reflecting surface 26 includes a plurality of micromirrors 27. In the micromirror array 25, the plurality of micromirrors 27 is arranged in a lattice like a fly's eye (fly eye). As illustrated in FIG. 3, the plurality of micromirrors 27 are arranged in, for example, an X direction on the reflecting surface 26 and a Y direction orthogonal to the X direction. Each of the micromirrors 27 has a rectangular shape in a front view, for example. The micromirror 27 has a long side with a length x in the X direction and a short side with a length y in the Y direction. In other words, the micromirror 27 has a mirror width of the length x in the X direction and a mirror height of the length y in the Y direction. The micromirrors 27 of the present embodiment have mirror widths of an identical length in the X direction and mirror heights of an identical length in the Y direction. It should be noted that the micromirrors 27 may each have an identical mirror width and mirror height. As illustrated in FIG. 4, the micromirror 27 is a convex curved surface. The micromirror 27 of the present embodiment is, for example, a projecting partially spherical surface. The micromirror 27 has an identical radius of curvature R in the X direction and the Y direction. The micromirrors 27 of the present embodiment have an identical divergence angle $\phi$ in the X direction and an identical divergence angle $\phi$ in the Y direction. As illustrated in FIG. 2, the divergence angle $\phi$ is an angle at which the light 11 reflected by the micromirror 27 spreads with respect to the optical axis. Since the luminance unevenness of the backlight unit 20 is likely to occur when the divergence angle $\phi$ increases, it is preferable that the divergence angle $\phi$ be 50° or less in a total angle.

The polarizing plate 28 is disposed on an optical path between the light collecting member 23 and the micromirror array 25. The polarizing plate 28 is a so-called reflective polarizing plate. The polarizing plate 28 of the present embodiment transmits a part of light incident from the light collecting member 23 and reflects light entering from the micromirror array 25 toward the liquid crystal panel 10. The polarizing plate 28 is disposed to be inclined with respect to an optical path between the light collecting member 23 and the micromirror array 25 so that light traveling from the light collecting member 23 toward the micromirror array 25 is transmitted and light reflected from the micromirror array 25 illuminates the entire surface of the liquid crystal panel 10. The polarizing plate 28 is disposed at a position inclined by 45° with respect to the direction of the optical path so that light is directed to the liquid crystal panel 10 disposed in parallel with the optical path between the light collecting member 23 and the micromirror array 25. The polarizing plate 28 is made of, for example, a wire grid polarizing plate or the like. In the wire grid polarizing plate, a metallic material is vapor-deposited on a substrate and a wire-like grid is formed by fine etching at a nanometer level.

The quarter wavelength plate 29 is disposed on a side of the micromirror array 25 with respect to the polarizing plate 28 on the optical path between the light collecting member 23 and the micromirror array 25. The quarter wavelength plate 29 is disposed at a position where light traveling from the polarizing plate 28 toward the micromirror array 25 is transmitted and light reflected from the micromirror array 25 is transmitted toward the polarizing plate 28. In other words, the quarter wavelength plate 29 is disposed near the micromirror array 25 so that one plane of the quarter wavelength plate 29 faces the reflecting surface 26 of the micromirror array 25. The quarter wavelength plate 29 is one type of so-called wavelength plate, and includes, for example, a birefringent material or the like. The quarter wavelength plate 29 is obtained by giving a phase difference (optical path difference) to two beams of linearly polarized light whose oscillation directions are orthogonal to each other.

When a linearly polarized light is entered, the quarter wavelength plate 29 emits a circular polarized light after converting the linearly polarized light into the circular polarized light. When a circular polarized light is entered, the quarter wavelength plate 29 emits a linearly polarized light after converting the circular polarized light into the linearly polarized light. To be more specific, the quarter wavelength plate 29 converts a linearly polarized light that oscillates in a direction inclined at 45 degrees with respect to the optical axis (first axis) of the quarter wavelength plate 29, out of the incoming light, into a circular polarized light, while the quarter wavelength plate 29 converts an incoming circular polarized light into a linearly polarized light that oscillates in a direction further inclined at 45 degrees with respect to the optical axis. The quarter wavelength plate 29 of the embodiment converts a light passing from the polarizing plate 28 to the micromirror array 25 into a circular polarized light from a linearly polarized light, and converts the light reflected toward the polarizing plate 28 by the micromirror array 25 into a linearly polarized light from the circular polarized light. In other words, the quarter wavelength plate 29 converts an incoming linearly polarized light with an oscillating direction into a linearly polarized light oscillating in a direction inclined at 90 degrees by transmitting the incoming light from the polarizing plate 28 to the micromirror array 25 and transmitting the light reflected by the micromirror array 25 to the polarizing plate 28.

The diffusing plate 30 is formed in a sheet shape or a thin plate shape and is disposed on an optical path between the polarizing plate 28 and the liquid crystal panel 10. The diffusing plate 30 diffuses the light 11 reflected by the polarizing plate 28 toward the liquid crystal panel 10.

Next, the operation of the backlight unit 20 according to the present embodiment will be described with reference to FIGS. 2 and 5. First, the light 11 emitted from the light source 21 is incident on the light collecting member 23 as illustrated in FIG. 2. The light 11 incident on the light collecting member 23 transmits through the lens main body portion 23b and exits from the lens surface 23a. The light 11 emitted from the lens surface 23a is condensed on the micromirror array 25 via the polarizing plate 28 and the quarter wavelength plate 29. That is, the light collecting member 23 is configured so that the light 11 emitted from the light source 21 is condensed on the micromirror array 25. The light 11 condensed on the micromirror array 25 may be parallel light, divergent light or convergent light.

The polarizing plate 28 causes the light 11 oscillating in a direction orthogonal to a reference oscillation direction to transmit therethrough, among beams of the light 11 incident from the light collecting member 23. Here, the reference oscillation direction is an oscillation direction of the light transmitted through the liquid crystal panel 10. By causing the light 11 traveling from the light collecting member 23 toward the micromirror array 25 to transmit through the polarizing plate 28, linearly polarized light parallel to a transmission axis of the polarizing plate 28 can be obtained. The light transmitted through the polarizing plate 28 is transmitted through the quarter wavelength plate 29 to the micromirror array 25. The quarter wavelength plate 29 converts the light incident from a side of the polarizing plate 28 and transmitting toward the micromirror array 25 into first polarized light that is a circular polarized light oscillating in a direction inclined by 45° with respect to the reference oscillation direction. This first polarized light is obtained by rotating linearly polarized light by 45° on an optical axis. A direction in which the optical axis is rotated may be either in a horizontal direction.

The light (first polarized light) incident on the micromirror array 25 is reflected by the reflecting surface 26 toward the light collecting member 23. As illustrated in FIG. 5, the plurality of micromirrors 27 constituting the reflecting surface 26 form a light source image 12 near a surface opposite to the reflecting surface 26 by the incident light. The light source image 12 is a so-called secondary light source. It is preferable that in each micromirror 27, the shape of the convex curved surface is determined so that the light from each light source image 12 is reflected by the polarizing plate 28 via the quarter wavelength plate 29 and illuminates the entire surface of the liquid crystal panel 10. That is, it is preferable that a curvature 1/R, a divergence angle φ, a mirror width, a mirror height, a pitch, and the like of each micromirror 27 are designed to illuminate the entire surface of the liquid crystal panel 10. The pitch is a distance between center points of two adjacent micromirrors 27. The light reflected from the reflecting surface 26 again transmits through the quarter wavelength plate 29 and travels toward the polarizing plate 28. The quarter wavelength plate 29 converts the light (first polarized light) reflected by the micromirror array 25 and transmitting toward the polarizing plate 28 into second polarized light oscillating in the same direction as the reference oscillation direction. The second polarized light is obtained by further rotating the optical axis by 45° with respect to the first polarized light. That is, the second polarized light is linearly polarized light that oscillates in a direction inclined by 90° with respect to a direction orthogonal to the reference oscillation direction, that is, in a direction identical to the reference oscillation direction by transmitting twice through the quarter wavelength plate 29.

Light (second polarized light) incident on the polarizing plate 28 from the side of the micromirror array 25 is reflected toward the liquid crystal panel 10. That is, the polarizing plate 28 reflects light (second polarized light) oscillating in the same direction as the reference oscillation direction toward the liquid crystal panel 10. The light reflected by the polarizing plate 28 is transmitted through the diffusing plate 30 and is incident on the liquid crystal panel 10. Since the light incident on the liquid crystal panel 10 coincides with the oscillation direction of the light transmitted through the liquid crystal panel 10, that is, the reference oscillation direction, the light incident on the liquid crystal panel 10 is suitable for light illuminating the liquid crystal panel 10.

As described above, the backlight unit 20 according to the present embodiment includes the light source 21, the light collecting member 23 for condensing the light 11 emitted from the light source 21, the micromirror array 25 having a concave reflecting surface 26 facing the light collecting member 23 and reflecting the light 11 incident from the light collecting member 23 toward the light collecting member 23 by the reflecting surface 26, the polarizing plate 28 that is disposed on the optical path between the light collecting member 23 and the micromirror array 25 and causes a part of the light 11 incident from the light collecting member 23 transmit therethrough and reflects, to the liquid crystal panel 10, the light 11 incident from the side of the micromirror array 25, the quarter wavelength plate 29 that is disposed on the optical path between the light collecting member 23 and the micromirror array 25 and on the side of the micromirror array 25 with respect to the polarizing plate 28, and the diffusing plate 30 that is disposed on the optical path between the polarizing plate 28 and the liquid crystal panel 10. The polarizing plate 28 causes light oscillating in a direction orthogonal to the reference oscillation direction to transmit to the quarter wavelength plate 29 among beams of the light 11 incident from the light collecting member 23, with the oscillation direction of the light transmitting through the liquid crystal panel 10 as the reference oscillation direction, and reflects light oscillating in the reference oscillation direction from the side of the micromirror array 25 toward the liquid crystal panel 10. The quarter wavelength plate 29 converts the light entering from the side of the polarizing plate 28 and transmitting toward the micromirror array 25 into the first polarized light, and converts the first polarized light reflected by the mirror array 25 and transmitting toward the polarizing plate 28 into the second polarized light oscillating in a direction identical to the reference oscillating direction.

In addition, the head-up display device 1 according to the present embodiment includes the enlarging mirror 2, the liquid crystal panel 10, and the backlight unit 20.

In the backlight unit 20 and the head-up display device 1 having the above-described configuration, the optical axes can be matched before and after reflection of light in the micromirror array 25, and a deflection angle α can be made minimum (=0°). The deflection angle α is a total angle formed by reflected light to the liquid crystal panel 10 with respect to incident light from the light collecting member 23, as illustrated in FIG. 5, for example. By setting this deflection angle α to 0°, the optical path between the light collecting member 23 and the micromirror array 25 and the optical path between the micromirror array 25 and the liquid crystal panel 10 can be made substantially equal distances and the occurrence of luminance unevenness can be suppressed. Further, since the luminance unevenness is reduced, unevenness in the brightness of the virtual image 110 recognized by the movement of the eye point 201 can be suppressed. Further, by folding the optical path, it is possible to reduce the size of the backlight unit 20. In addition, since the polarizing plate 28 and the quarter wavelength plate 29 are disposed in combination with each other on the optical path, an optical system for illumination can be configured without restricting the degree of freedom of folding and arranging the optical path. Further, since the polarizing plate 28 is disposed at a position distant from the liquid crystal panel 10 and heat by light not transmitted through the liquid crystal panel 10 is received, it is possible to suppress the temperature rise of the liquid crystal panel 10. Since the temperature rise of the liquid crystal panel 10 is suppressed, the heat resistant temperature of the liquid crystal panel 10 can be lowered, and cost reduction can be achieved.

In the backlight unit 20 and the head-up display device 1 having the above-described configuration, the reflecting surface 26 of the micromirror array 25 includes the plurality of micromirrors 27, and each micromirror 27 is a convex curved surface. Accordingly, a plurality of light source images 12 can be formed, and the entire surface of the liquid crystal panel 10 can be illuminated by each light source image 12. As a result, luminance unevenness of the liquid crystal panel 10 can be suppressed. Furthermore, conventionally, in order to illuminate the entire surface of the liquid crystal panel, the size of the lens array and a plurality of light sources are required. However, since the plurality of light source images 12 can be formed by the micromirror array 25, a plurality of light sources are unnecessary, and the size of the optical system can be reduced. Furthermore, in the case of using a plurality of light sources, luminance unevenness occurs at a portion where light overlaps, but illumination with one light source 21 becomes possible. Accordingly, it is possible to reduce power consumption and reduce luminance unevenness.

Figure 6:
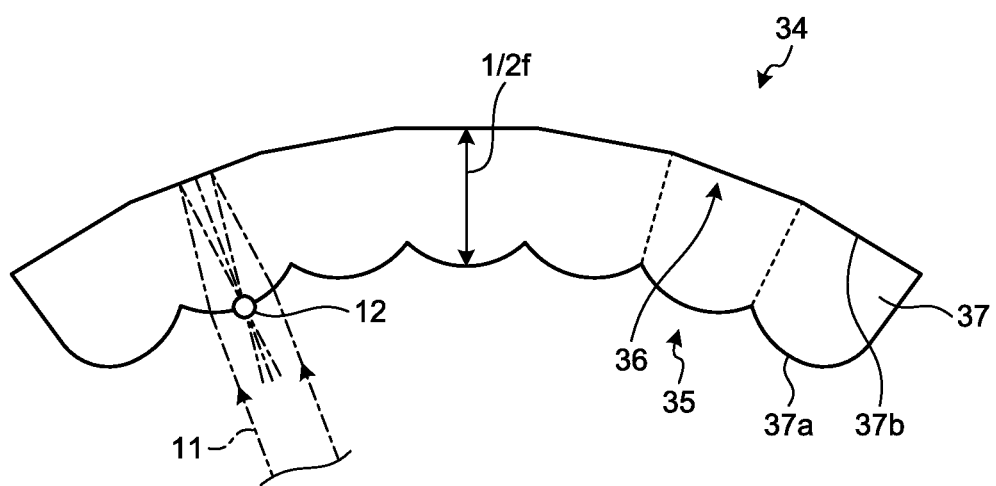
FIG. 6 is a schematic configuration diagram of a microlens array according to a modification of the embodiment.

In the above embodiment, the micromirror array 25 is used as an optical member, but the present invention is not limited to this. FIG. 6 is a schematic configuration diagram of a microlens array according to a modification of the embodiment. The backlight unit 20 according to the modification includes the light source 21, the light collecting member 23, a microlens array 34, the polarizing plate 28, the quarter wavelength plate 29, and the diffusing plate 30. The microlens array 34 includes the plurality of microlenses 37 formed along a reflecting surface 36. Each microlens 37 has a lens surface 37a which is a concave curved surface and a micro-reflecting surface 37b corresponding to the lens surface 37a. The plurality of lens surfaces 37a is arranged in a lattice like fly's eye (fly's eye). The plurality of lens surfaces 37a constitutes a so-called lens array surface 35. The micro-reflecting surface 37b constitutes the reflecting surface 36. The reflecting surface 36 is a so-called facet mirror surface.

When the light 11 incident on the microlens array 34 is incident on the microlens 37 from the lens surface 37a, the light 11 condenses and travels toward the micro-reflecting surface 37b. The light 11 reflected by the micro-reflecting surface 37b forms an image at the vertex of the lens surface 37a. This vertex is the light source image 12. A distance from the apex of the lens surface 37a to the micro-reflecting surface 37b is ½f. The microlens 37 of the present embodiment forms the light source image 12 as a secondary light source at the vertex of the lens surface 37a which is separated by a distance ½f from the micro-reflecting surface 37b. In addition to the above effects, since the backlight unit 20 and the head-up display device 1 according to the modification of the present embodiment can form the secondary light source (light source image 12) that is strong against errors in an incident angle and small in divergence angle error by the array structure of the microlens 37 and the micro-reflecting surface 37b, the luminance efficiency of the secondary light source can be increased.

Modification

In the above embodiment and modification, the light source 21 includes one light emitting diode, but the present invention is not limited thereto. The light source 21 may be, for example, obtained by integrating a plurality of light emitting diodes into one. In addition, the light source 21 is not limited to a light emitting diode as long as the light source 21 emits high-brightness light.

In the above embodiment, the micromirror 27 has a rectangular shape when viewed from the front, but the present invention is not limited thereto, and the micromirror 27 may be a square shape, a circular shape, or a hexagonal shape. Although the micromirror 27 is a convex curved surface, the present invention is not limited thereto, and the micromirror 27 may be a concave curved surface.

In the above embodiment, although the polarizing plate 28 is disposed at a position of an inclination angle of 45° with respect to the optical path between the light collecting member 23 and the micromirror array 25, the present invention is not limited thereto, and the polarizing plate 28 may be disposed at a position of an inclination angle according to the position of the liquid crystal panel 10.

Further, in the above-described embodiment and modification, in the head-up display device 1, the projection target of the display image is the windshield 101, but the present invention is not limited thereto, and the projection target may be, for example, a combiner or the like.

In the above-described embodiment and modification, a case where the head-up display device 1 is applied to a vehicle has been described, but the present invention is not limited thereto, and for example, the head-up display device 1 may be applied to a device other than a vehicle such as a ship or an aircraft.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A backlight unit comprising:
a light source;
a light collecting member condensing light emitted from the light source;
an optical member having a concave reflecting surface facing the light collecting member and reflecting light incident from the light collecting member toward the light collecting member by the reflecting surface;
a polarizing plate disposed on an optical path between the light collecting member and the optical member, transmitting a part of light incident from the light collecting member, and reflecting light incident from a side of the optical member toward a light transmitting type liquid crystal display element;
a quarter wavelength plate disposed on the optical path between the light collecting member and the optical member and on the side of the optical member with respect to the polarizing plate; and
a diffusing plate disposed on an optical path between the polarizing plate and the liquid crystal display element, wherein
the polarizing plate
causes light oscillating in a direction orthogonal to a reference oscillation direction to transmit to the quarter wavelength plate among beams of the light incident from the light collecting member, with an oscillation direction of the light transmitting through the liquid crystal display element as the reference oscillation direction, and reflecting light oscillating in the reference oscillation direction from the side of the optical member toward the liquid crystal display element, and
the quarter wavelength plate
converts light incident from a side of the polarizing plate and transmitting to the side of the optical member into first polarized light, and
converts the first polarized light reflected by the optical member and transmitting to the side of the polarizing plate into second polarized light oscillating in a direction identical to the reference oscillating direction.

2. The backlight unit according to claim 1, wherein
the optical member has the reflecting surface including a plurality of micromirrors, and
each of the micromirrors is a convex or concave curved surface.

3. The backlight unit according to claim 1, wherein
the optical member includes a plurality of microlens formed along the reflecting surface, and
each of the microlenses has a lens surface having a convex or concave curved surface, and a micro reflecting surface corresponding to the lens surface.

4. A head-up display device comprising:
a light transmitting type liquid crystal display element; and
a backlight unit, wherein
the backlight unit includes
a light source;
a light collecting member that condenses light emitted from the light source;
an optical member having a concave reflecting surface facing the light collecting member and reflecting light incident from the light collecting member toward the light collecting member by the reflecting surface;
a polarizing plate disposed on an optical path between the light collecting member and the optical member, transmitting a part of light incident from the light collecting member, and reflecting light incident from a side of the optical member toward the light transmitting type liquid crystal display element;
a quarter wavelength plate disposed on the optical path between the light collecting member and the optical member and on the side of the optical member with respect to the polarizing plate; and
a diffusing plate disposed on an optical path between the polarizing plate and the liquid crystal display element, wherein
the polarizing plate
causes light oscillating in a direction orthogonal to a reference oscillation direction to transmit to the quarter wavelength plate among beams of the light incident from the light collecting member, with an oscillation direction of the light transmitting through the liquid crystal display element as the reference oscillation direction, and reflects light oscillating in the reference oscillation direction from the side of the optical member toward the liquid crystal display element, and the quarter wavelength plate
converts light incident from a side of the polarizing plate and transmitting to the side of the optical member into a first polarized light, and
converts light incident from the side of the optical member and transmitting to the side of the polarizing plate into a second polarized light oscillating in a direction identical to the reference oscillating direction.

* * * * *